(12) United States Patent
Lemp et al.

(10) Patent No.: US 8,465,393 B2
(45) Date of Patent: Jun. 18, 2013

(54) METHOD FOR ACCELERATING THE DECOUPLING OF A STARTING CLUTCH, WHICH RELEASABLE CONNECTS AN ELECTRIC MACHINE TO A TRANSMISSION INPUT, IN A HYBRID DRIVE TRAIN OF A VEHICLE

(75) Inventors: Thomas Lemp, Langenargen (DE); Alexander Pfau, Fronreute (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 59 days.

(21) Appl. No.: 13/299,756

(22) Filed: Nov. 18, 2011

(65) Prior Publication Data
US 2012/0129650 A1     May 24, 2012

(30) Foreign Application Priority Data
Nov. 24, 2010   (DE) .......................... 10 2010 061 826

(51) Int. Cl.
*H02P 15/00*        (2006.01)
(52) U.S. Cl.
USPC ............................................................ 477/8

(58) Field of Classification Search
USPC ......................................................... 477/5, 8
See application file for complete search history.

(56) References Cited

U.S. PATENT DOCUMENTS

| | | | |
|---|---|---|---|
| 6,808,470 B2 * | 10/2004 | Boll | 477/6 |
| 7,306,064 B2 | 12/2007 | Imazu et al. | |
| 7,871,354 B2 | 1/2011 | Steinhauser et al. | |
| 8,298,118 B2 * | 10/2012 | Kim et al. | 477/15 |

FOREIGN PATENT DOCUMENTS

| | | |
|---|---|---|
| DE | 10 2004 001 381 A1 | 8/2005 |
| EP | 1 502 791 A2 | 2/2005 |
| WO | 2007/093249 A1 | 8/2007 |

* cited by examiner

*Primary Examiner* — Dirk Wright
(74) *Attorney, Agent, or Firm* — Davis & Bujold, P.L.L.C.

(57) ABSTRACT

A method of accelerating decoupling of the starting clutch (5) that is able to connect the electric machine (2) to the transmission input in a hybrid drive-train of a motor vehicle, when a decoupling command is issued, at the same time as the regulation of the starting clutch begins for the purpose of decoupling the starting clutch (5) or a specified time after the regulation of the starting clutch begins. The electric machine is regulated in such manner that a torque is built up such that the transition to sliding friction, and thus decoupling and the onset of slip, are sped up while maintaining the nominal driving torque.

5 Claims, 3 Drawing Sheets

METHOD FOR ACCELERATING THE DECOUPLING OF A STARTING CLUTCH, WHICH RELEASABLE CONNECTS AN ELECTRIC MACHINE TO A TRANSMISSION INPUT, IN A HYBRID DRIVE TRAIN OF A VEHICLE

This application claims priority from German patent application serial no. 10 2010 061 826.8 filed Nov. 24, 2010.

FIELD OF THE INVENTION

The invention concerns a method for speeding up the decoupling of the starting clutch that connects the electric machine releasably to the transmission input in a hybrid drive-train of a motor vehicle, particularly in a parallel hybrid drive-train.

BACKGROUND OF THE INVENTION

From the prior art, vehicles with a parallel hybrid drive-train are known, in which addition of the torques of the internal combustion engine and at least one electric machine, that can be connected with the internal combustion engine, takes place preferably by means of a summation transmission, for example by a planetary transmission. In such a case the at least one electric machine can be connected to the belt drive or to the crankshaft of the internal combustion engine by means of a first clutch. The torques produced by the internal combustion engine and/or the at least one electric machine are transmitted, via a downstream transmission, to the driven axle. Further, it is known from the prior art to arrange the internal combustion engine and the electric machine in series.

According to the prior art, in parallel hybrid drive-trains an optional further clutch can be provided, which connects the transmission releasably to the drive unit consisting of the internal combustion engine and the electric machine, and which can serve as the starting clutch. In such a case the transmission can be connected releasably by the starting clutch to the electric machine.

In a parallel hybrid drive-train, depending on the operating strategy the drive mode of the vehicle can change between internal combustion engine-powered, electric machine-powered and mixed driving operation, and the situation can often arise that the internal combustion engine is started from a purely electric machine-powered drive mode.

From the prior art it is known to start up the internal combustion engine by means of a so-termed drag start; in this case, with the clutch located between the electric machine and the internal combustion engine engaged, the torque of the electric machine overcomes the drag resistance of the internal combustion engine so that the internal combustion engine is accelerated to its starting speed. Preferably, to carry out a drag start of the internal combustion engine the starting clutch provided between the electric machine and the vehicle's transmission is operated with a specified amount of slip.

When the starting clutch is in the engaged condition and slip is to be produced by reducing the torque to be transmitted by the starting clutch during its decoupling, i.e. by relaxing the rotationally fixed connection between the electric machine and the vehicle's transmission, for example because the internal combustion engine has to be started up by a drag start, then according to the prior art the starting clutch is controlled so as to reduce its current torque transmission far enough for the desired slip to be produced. To do this the starting clutch must be controlled in such a manner that the torque transmitted is smaller than the torque to be transmitted that corresponds to the slip desired.

Disadvantageously, this results in a delay in the drive-train because the clutch has to be changed from static friction to sliding friction. This delay can be perceived as unpleasant, particularly when the desired slip is only produced after a lengthy time interval, as can be the case for example when the torque to be transmitted is around 0 Nm; in such a case the torque transmitted by the starting clutch has to be greatly reduced.

From DE 10 2004 001 381 A1 by the present applicant a method is known for increasing the spontaneity of overlapping shifts in an automatic transmission, in which, with the shift command or immediately after it an engine ignition is specified, by which snatch opening of the shifting element provided in the transmission and to be disengaged and/or an increase of the speed gradient of the turbine rotation speed is achieved, the engine ignition taking place by the specification of a nominal speed to be produced or by the specification of a nominal engine torque to be produced.

Further, WO 2007/093249 A1 describes a method for decoupling at least one torque source from at least one other torque source in a drive-train which, to produce a drive output torque at its rear end, extends over a plurality of torque sources arranged one after another and connected mechanically to one another by rotating shafts, such that between at least one pair of torque sources is arranged a separator clutch which is disengaged to decouple the torque source positioned before the separator clutch from the remainder of the drive-train behind the separator clutch, and such that on either side of the separator clutch in each case at least one torque source can be controlled in relation to its torque provision to the drive-train to produce a required variation of the output torque.

In this known method it is provided that the at least two controllable torque sources arranged on different sides of the separator clutch are controlled during a decoupling preparation period before the separator clutch is disengaged, in such manner that the sum of the torques acting overall on the separator clutch at the end of the decoupling preparation period is raised and the required variation of the output torque is maintained during the decoupling preparation period. Preferably, the separator clutch releasably connects an internal combustion engine and an electric machine with one another.

By virtue of the method known from WO 2007/093249 A1 the jerky fluctuations of the output torque that occur when the internal combustion engine is decoupled, which can lead to likewise jerky (positive or negative) acceleration of the vehicle as a whole, should be reduced.

From EP 1 502 791 A2 a hybrid drive-train for a motor vehicle is known, in which a clutch is arranged between an internal combustion engine and a transmission, by means of which the internal combustion engine can be decoupled from the drive-train. In this case it is provided that when the clutch is to be disengaged, the torque transmitted by the clutch and optionally the gradient of the torque transmitted by the clutch are reduced before the clutch is disengaged.

SUMMARY OF THE INVENTION

The purpose of the present invention is to indicate a method for speeding up the decoupling of the starting clutch that connects the electric machine releasably with the transmission input in a hybrid drive-train of a motor vehicle, in particular in a parallel hybrid drive-train, by implementing which method the aforesaid delays in the drive-train are largely avoided.

Accordingly, a method is proposed for accelerating the decoupling of the starting clutch that connects the electric machine releasably with the transmission input in a hybrid drive-train of a motor vehicle, in which when a decoupling demand exists, at the same time as the beginning of the process of controlling the starting clutch for the purpose of decoupling it or a specified time after the control of the starting clutch begins, the electric machine is regulated in such manner that a torque is built up by the electric machine, whereby the change to sliding friction and hence the decoupling and the onset of slip are speeded up while the nominal driving torque is maintained.

According to a first, particularly advantageous version of the invention the control system outputs a nominal speed for the electric machine and the speed regulator of the electric machine builds up the torque that corresponds to the nominal speed. If slip does not begin after a specified time the speed and thus also the torque of the electric machine are reduced. In this way an undesired acceleration of the vehicle caused by the additional torque of the electric machine is avoided.

According to a second particularly advantageous version of the invention the control system outputs a nominal torque for the electric machine, which is transmitted to the electric machine as a provisional control torque. If slip does not begin after a specified time the provisional control torque of the electric machine is reduced and the decoupling is interrupted, whereby undesired acceleration of the vehicle caused by the additional torque of the electric machine is avoided, as already explained.

By virtue of the regulation of the electric machine according to the invention, on the one hand the decoupling of the starting clutch is sped up, and on the other hand the nominal driving torque is maintained, so that no undesired lags occur in the drive-train.

The value of the nominal speed or nominal torque depends on the operating point of the drive-train at the time, and can be stored in the control system in the form of a characteristic curve.

BRIEF DESCRIPTION OF THE DRAWINGS

Below, an example of the invention is explained in more detail with reference to the attached figures, which show.

DETAILED DESCRIPTION OF THE PREFERRED EMBODIMENTS

Figure 1:
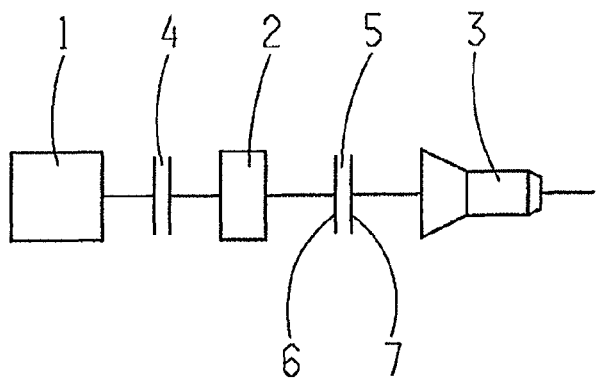
FIG. 1: A schematic representation of a parallel hybrid drive-train of a motor vehicle comprising a starting clutch.

In FIG. 1 the internal combustion engine is indexed 1, the electric machine 2 and the vehicle's transmission 3. Between the internal combustion engine 1 and the electric machine 2 is arranged a first clutch 4, by means of which the internal combustion engine 1 can be connected releasably to the electric machine 2. In this case therefore the internal combustion engine 1 and the electric machine 2 are arranged in series.

Furthermore, between the electric machine 2 and the vehicle's transmission 3 is arranged a second clutch 5 that serves as a starting clutch, by which the electric machine 2 can be connected releasably to the transmission input. In FIG. 1 the primary side of the starting clutch is indexed 6 and its secondary side 7.

The method according to the invention will be explained considering the example of decoupling the starting clutch for the purpose of carrying out a drag start of the internal combustion engine.

In FIGS. 2, 3, 4 and 5 the time variation of the status of the starting clutch 5 is represented by curve A, the time variation of the actual speed of the primary side 6 of the starting clutch 5 by curve C, the time variation of the actual speed of the secondary side 7 of the starting clutch 5, i.e. the electric machine 2, by curve D, the time variation of the nominal drive torque, i.e. the nominal torque at the drive output, by curve E, and the time variation of the clutch torque by curve F. In addition, curve G shows the status of the 'drag start' function, curve H shows the status of the 'decoupling command' function, and curve I shows the status of the initiation of a timer, while curve J shows the status of the 'activation of the nominal speed specification' function (in FIGS. 2 and 3) or the 'activation of the preliminary control torque' (in FIGS. 4 and 5). The time variation of the timer is illustrated by curve K.

Figure 2:
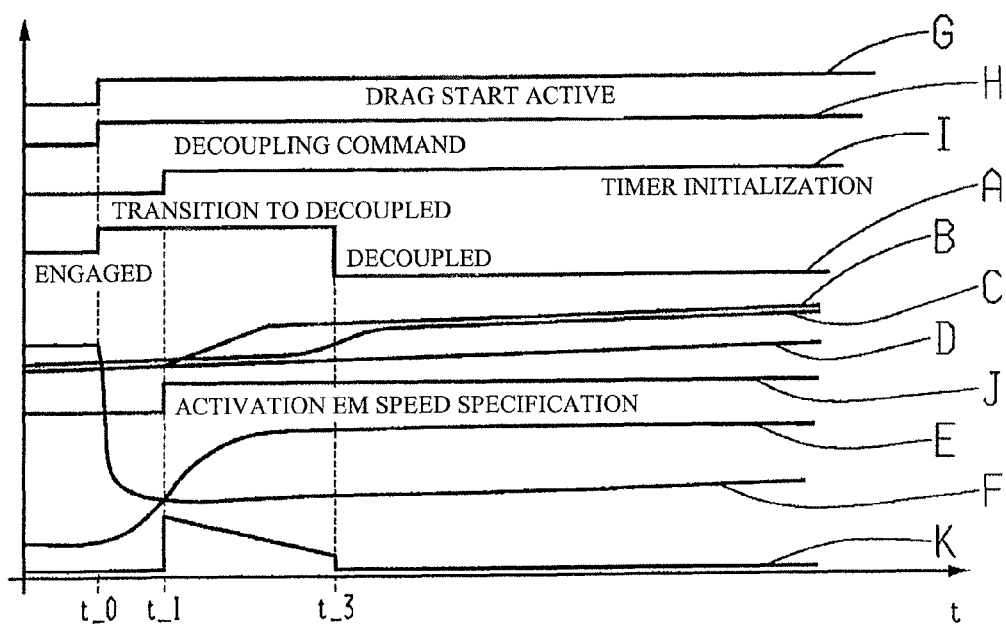
FIG. 2: A diagram showing the variations of the starting clutch status, the nominal electric machine speed, the actual speed of the primary side of the starting clutch and the actual speed of the secondary side of the starting clutch, the nominal driving torque and the clutch torque, as functions of time, in a first variant of the method according to the invention when the starting clutch has been decoupled within a specified time.
Figure 3:
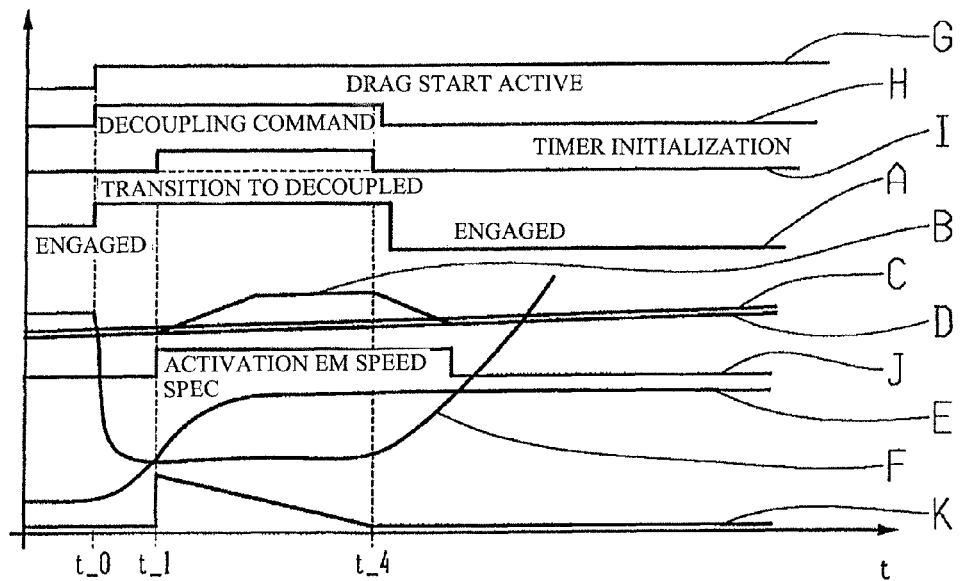
FIG. 3: A diagram showing the variations of the starting clutch status, the nominal electric machine speed, the actual speed of the primary side of the starting clutch and the actual speed of the secondary side of the starting clutch, the nominal driving torque and the clutch torque, as functions of time, in a first variant of the method according to the invention when the starting clutch has not been decoupled within a specified time.
Figure 4:
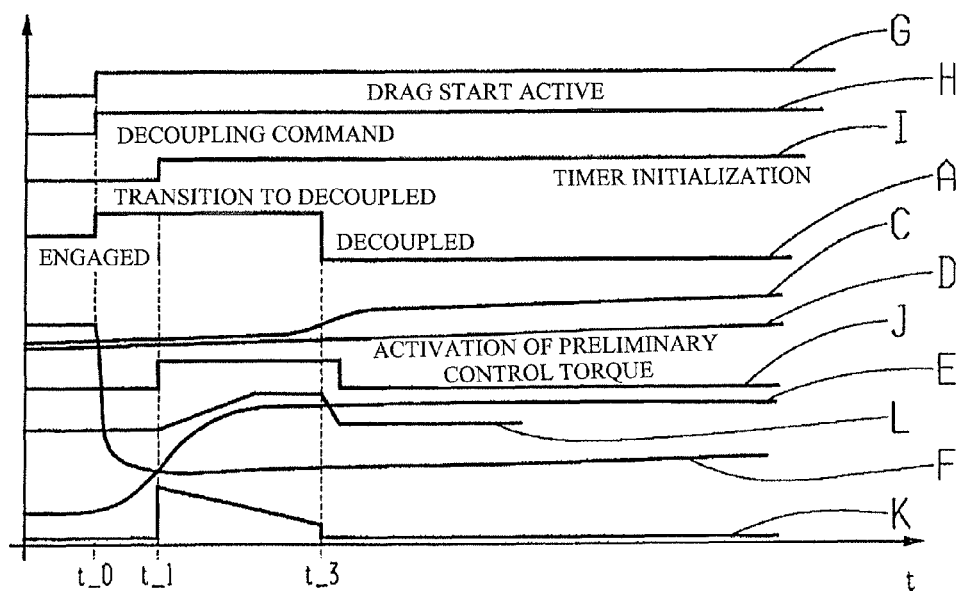
FIG. 4: A diagram showing the variations of the starting clutch status, the nominal electric machine speed, the actual speed of the primary side of the starting clutch and the actual speed of the secondary side of the starting clutch, the nominal driving torque and the clutch torque, as functions of time, in a second variant of the method according to the invention when the starting clutch has been decoupled within a specified time.
Figure 5:
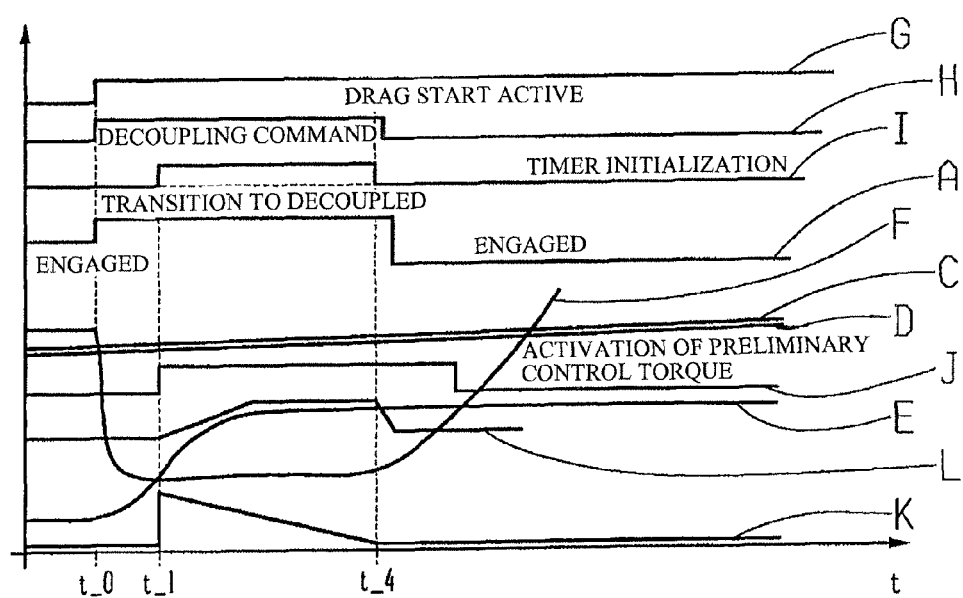
FIG. 5: A diagram showing the variations of the starting clutch status, the nominal electric machine speed, the actual speed of the primary side of the starting clutch and the actual speed of the secondary side of the starting clutch, the nominal driving torque and the clutch torque, as functions of time, in a second variant of the method according to the invention when the starting clutch has not been decoupled within a specified time.

Furthermore, the time variation of the nominal speed of the electric machine 2 is shown by curve B in FIGS. 2 and 3; in FIGS. 4 and 5 the curve L shows the variation of the preliminary control torque of the electric machine 2 as a function of time.

Referring to FIGS. 2, 3, 4 and 5, at time t_0 a drag start of the internal combustion engine is called for and at the same time a decoupling command for the starting clutch 2 is emitted so that for the purpose of decoupling it, the starting clutch 2 is controlled in such manner that the clutch torque (curve F) is reduced.

According to the invention and referring to FIG. 2, at a defined time after the controlling of the starting clutch 5 begins for the purpose of decoupling a nominal speed is specified for the electric machine 2, which is regulated in such manner that the nominal speed and thus a corresponding torque are built up. The regulation of the electric machine 2 begins at time t_1. At the same time as the regulation of the electric machine 2 begins, a timer is started.

In the example shown in FIG. 2 the decoupling of the starting clutch, which is indicated by the speed difference between the primary side 6 and the secondary side 7 of the starting clutch 5, takes place at time t_3, i.e. before the timer runs its course.

In the case when no decoupling has taken place within the specified time, i.e. before the timer has run its course, immediately after the timer has run its course the speed and thus the torque of the electric machine 2 are reduced, as shown in FIG. 3; this interrupts the decoupling. In the example shown in FIG. 3 the timer lapses at time t_4, and from the variations of the actual speeds of the primary side 6 and the secondary side 7 of the starting clutch 5 it can be seen that at that time no decoupling of the starting clutch 5 has taken place.

The example shown in FIG. 4 differs from that shown in FIG. 2 in that at a defined time after the regulation of the starting clutch 5 begins for the purpose of decoupling it, it is not a nominal speed but a nominal torque which is specified for the control of the electric machine 2, which is transmitted to the electric machine as a pilot control torque.

Analogously to the example in FIG. 2, the regulation of the electric machine 2 begins at time t_1 and at the same time as the regulation of the electric machine 2 begins, a timer is started. The decoupling of the starting clutch takes place at time t_3, i.e. before the timer has run its course. In the example shown, once the starting clutch 5 has been decoupled the pilot control torque is reduced.

If no decoupling of the starting clutch 5 has taken place within the specified time, i.e. before the timer has run its course, then immediately after the timer has run its course the pilot control torque of the electric machine 2 is reduced, as shown in FIG. 5; the timer runs out at time t_4, and from the variations of the actual speeds of the primary side 6 and the secondary side 7 of the starting clutch 5 it can be seen that, at that time, no decoupling has taken place.

Thanks to the concept according to the invention, the decoupling of the starting clutch can be accelerated while at the same time maintaining the nominal driving torque, whereby the driving comfort is increased.

Indexes

1 Internal combustion engine
2 Electric machine
3 Transmission
4 First clutch
5 Starting clutch
6 Primary side of the starting clutch
7 Secondary side of the starting clutch
A Time variation of the status of the starting clutch 5
B Time variation of the nominal rotation speed of the electric machine 2
C Time variation of the actual rotation speed of the primary side 6 of the starting clutch 5
D Actual rotation speed of the secondary side 7 of the starting clutch 5
E Time variation of the nominal driving torque
F Time variation of the clutch torque
G Status of the "drag start" function
H Status of the "Decoupling command" function
I Status of the initialization of a timer
J Status of the "activation of the nominal rotation speed specification" function
K Time variation of the timer
L Time variation of the pilot control torque of the electric machine 2

The invention claimed is:

1. A method of accelerating decoupling of a starting clutch (5) that releasably connects an electric machine (2) to a transmission input in a hybrid drive-train of a motor vehicle, the method comprising the steps of:
   regulating the electric machine (2), when a decoupling command is issued, at the same time as regulation of the starting clutch begins for the purpose of decoupling the starting clutch (5) or a specified time after the regulation of the starting clutch begins, in such a manner that a torque is built up, whereby a transition to sliding friction, and thus the decoupling, are sped up while still maintaining a nominal driving torque.

2. The method of accelerating the decoupling of the starting clutch (5) that releasably connects the electric machine (2) to the transmission input in the hybrid drive-train of the motor vehicle according to claim 1, further comprising the steps of:
   specifying, via a control system, a desired nominal speed for the electric machine (2), and
   building up a torque, that corresponds to a desired nominal speed, with a speed regulator of the electric machine.

3. The method of accelerating the decoupling of the starting clutch (5) that releasably connects the electric machine (2) to the transmission input in the hybrid drive-train of the motor vehicle according to claim 1, further comprising the step of specifying a desired nominal torque for the electric machine (2, via a control system, which is transmitted to the electric machine (2) as a pilot control torque.

4. The method of accelerating the decoupling of the starting clutch (5) that releasably connects the electric machine (2) to the transmission input in the hybrid drive-train of the motor vehicle according to claim 2, further comprising the step of specifying a value of either the desired nominal speed or a desired nominal torque, that depends on an operating point of the drive-train at a time, and storing the value in the control system as a characteristic curve.

5. The method of accelerating the decoupling of the starting clutch (5) that releasably connects the electric machine (2) to the transmission input in the hybrid drive-train of the motor vehicle according to claim 2, further comprising the step of, when no decoupling occurs within a specified time, reducing either the speed or a pilot control torque of the electric machine (2)to avoid any undesired acceleration of the vehicle due to additional torque of the electric machine (5).

* * * * *